United States Patent [19]

Barry

[11] Patent Number: 5,114,574
[45] Date of Patent: May 19, 1992

[54] BACKFLUSH FILTER SYSTEM WITH INSERT MEMBER DIFFUSING FILTERING AND BACKFLUSH FLOW

[75] Inventor: Robert M. Barry, St. Paul, Minn.

[73] Assignee: CFR Corporation, Roseville, Minn.

[21] Appl. No.: 556,175

[22] Filed: Jul. 23, 1990

[51] Int. Cl.$^5$ .......................................... B01D 21/30
[52] U.S. Cl. ...................... 210/137; 15/321; 210/167; 210/232; 210/411; 210/456; 210/457; 210/472
[58] Field of Search .................. 15/321, 353; 210/108, 210/167, 194, 232, 258, 456, 457, 458, 497.01, 409, 411, 137, 459, 460, 472, 416.1; 134/111

[56] References Cited

U.S. PATENT DOCUMENTS

| | | | |
|---|---|---|---|
| 2,825,355 | 3/1958 | Archer | 210/108 |
| 2,846,074 | 8/1958 | Brundage | 210/457 |
| 3,431,582 | 3/1969 | Grave | 15/321 |
| 4,351,723 | 9/1982 | Palmer | 210/258 |
| 4,427,547 | 1/1984 | Miller et al. | 210/456 |
| 4,466,155 | 8/1984 | Grave | 210/409 |
| 4,586,298 | 5/1986 | Trevarthen | 15/321 |
| 4,649,594 | 3/1987 | Grave | 15/321 |
| 4,696,075 | 9/1987 | Grave | 15/321 |

FOREIGN PATENT DOCUMENTS 300182 1/1989 European Pat. Off. ............ 210/457

Primary Examiner—W. Gary Jones
Assistant Examiner—Joseph Drodge
Attorney, Agent, or Firm—John W. Adams

[57] ABSTRACT

A back flush filter system for a cleaning apparatus which includes a hollow filter member with a flow diffusing member inserted therein to cause the flow through the filter to be diffused into a substantially circumferential uniform flow passage through the entire area of the screen in both the filtering mode and the back flow mode of operation and including an atmospheric air vent to permit air entrapped within liquid flow system to escape and thus maintain a substantially air free liquid flow system.

6 Claims, 2 Drawing Sheets

BACKFLUSH FILTER SYSTEM WITH INSERT MEMBER DIFFUSING FILTERING AND BACKFLUSH FLOW

BACKGROUND OF THE INVENTION

This invention relates generally to a filter structure for the fluid being used and recycled in connection with fabric and rug cleaning equipment. The prior art patents have a problem producing efficient back flow cleaning of a filter head. Such a patent is U.S. Pat. No. 4,696,075, issued Sep. 29, 1987 to Dale L. Grave. The back flow cleaning system embodied in the Grave patent fails to provide any means for uniformly distributing the flow of liquid through the entire area of the filter screen in either direction and also fails to provide means for removing air from the system.

SUMMARY OF THE INVENTION

The present invention is specifically designed to provide a self-cleaning, air-venting filter system which directs the flow of liquid through a hollow cylindrical filter element so that the fluid is distributed substantially uniformly across both the inside and outside surfaces of the cylindrical filter element to provide uniform flow of liquid through the entire area of the filter element in both directions. This filter assembly also is specifically designed to permit quick and easy changing of the filter element without damaging the filter gaskets.

DETAILED DESCRIPTION OF THE DRAWINGS

DETAILED DESCRIPTION OF A PREFERRED EMBODIMENT

Figure 1:
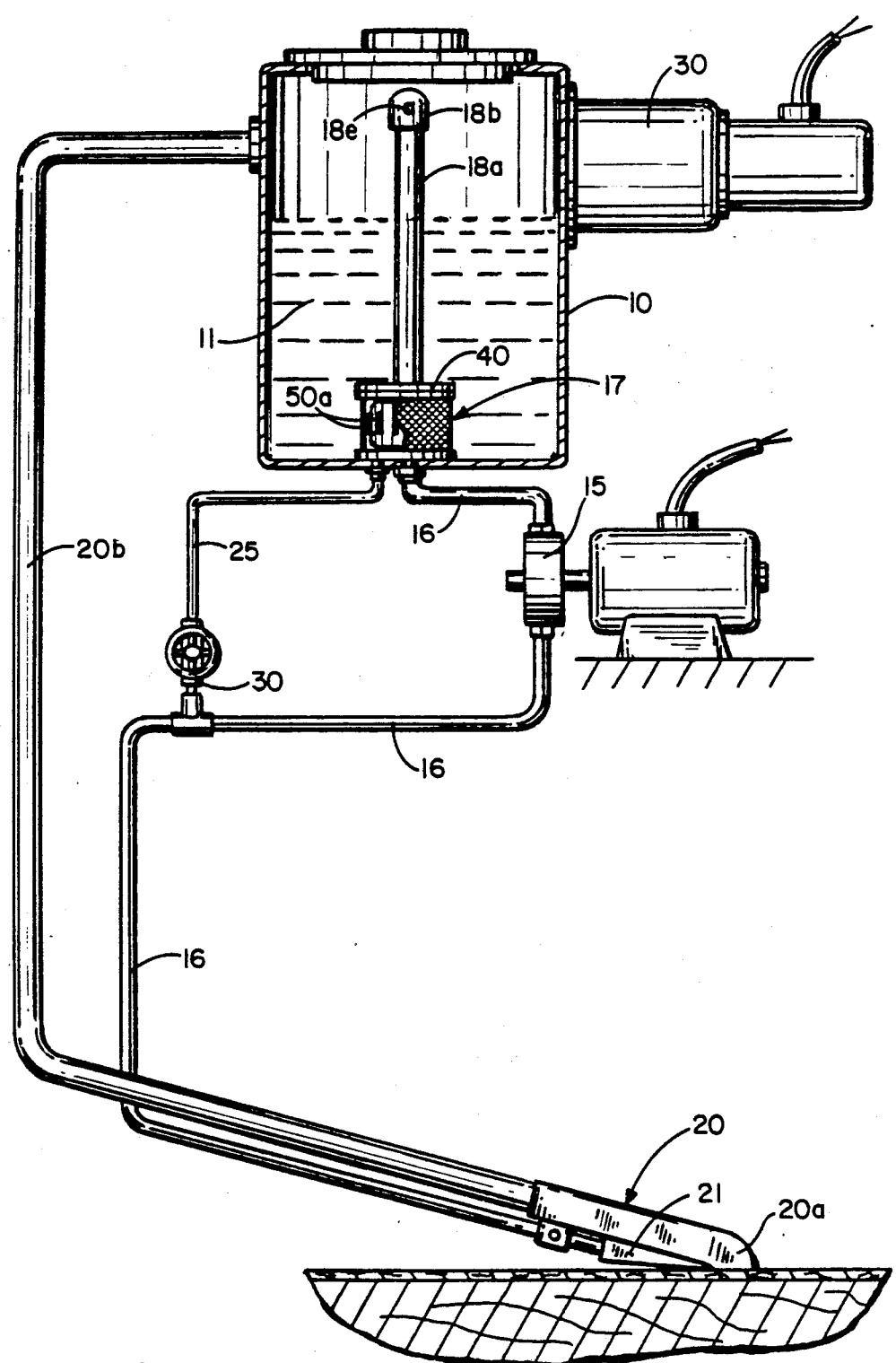
FIG. 1 is a diagrammatic view showing the relationship of the apparatus embodying this invention.

A liquid supply tank 10 is illustrated in FIG. 1 having a supply of cleaning liquid 11 confined therein. A liquid supply pump 15 is connected to a supply line 16 communicating with the liquid 11 within the tank 10 through a filter unit 17. The pump 15 delivers liquid under pressure to a cleaning head assembly 20 which includes a valve controlled spray nozzle 21 designed to produce a controlled spray of cleaning liquid through the liquid supply line 16. The construction of the spray nozzle 21 includes a liquid control valve (not shown) and may be similar to that disclosed in U.S. Pat. No. 4,696,075 to Dale L. Grave.

A vacuum system 30 is connected to the upper portion of the tank to draw air and dirty cleaning liquid upwardly through a suction nozzle 20a of the cleaning head 20 and vacuum line 20b. A bypass conduit 25 has a T-connection with supply line 18 from the pump 15 and carries the bypass flow of liquid from the supply conduit 16 back to the inside of the cylindrical filter element 17. A bypass valve 30 is provided to control the bypass flow through conduit 25 according to the pressure produced in line 16.

A cylindrical filter screen 17a having top and bottom sealing rings 17b and 17c around the upper and lower ends thereof is securely clamped between the bottom of the tank and an upper clamping disk 40. A stand pipe 18a is threadably connected in the bottom of the tank 10 and the filter element 17 is clamped therearound as by a hold down unit having disk 40 fixed to the bottom thereof and a hollow sleeve 41 extending upwardly around the stand pipe 18a. A screw cap 18b is provided at the top of the sleeve 41 and is threadably connected to the top of the stand pipe 18a and engages the top of sleeve 41 to positively hold the disk 40 in sealed engagement against the top filter ring 17b and clamp the lower filter ring 17c against the bottom of the tank without causing damaging rotation of the sealing rings 17b and 17c on the surfaces which they sealingly engage.

A flow guiding insert plug 50 is mounted within the filter chamber defined within the cylindrical filter screen 17a and has a generally cylindrical outer surface with a plurality of spacer ribs 50a provided on the outside of the circumferential portion thereof and extend substantially parallel to the axis of the plug. The outside diameter of the plug at the ribs 50a is slightly less than the inside diameter of the screen 17a and the spacer ribs 50a provide an annular passage for liquid flowing through the screen and permit the liquid to flow upwardly and downwardly through substantially the entire filtering area of the screen, as best shown in FIGS. 2 and 3.

Figure 2:
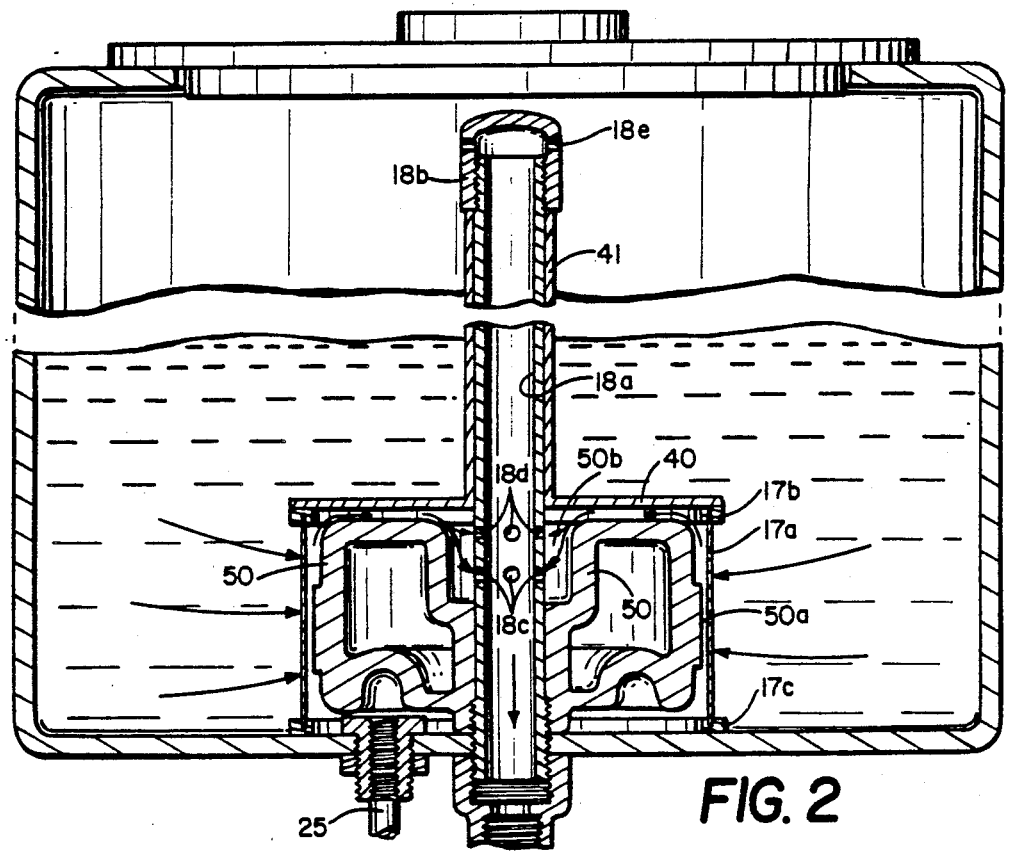
FIG. 2 is a sectional view through the filter unit showing the direction and distribution of flow during the operative flow pattern.
Figure 3:
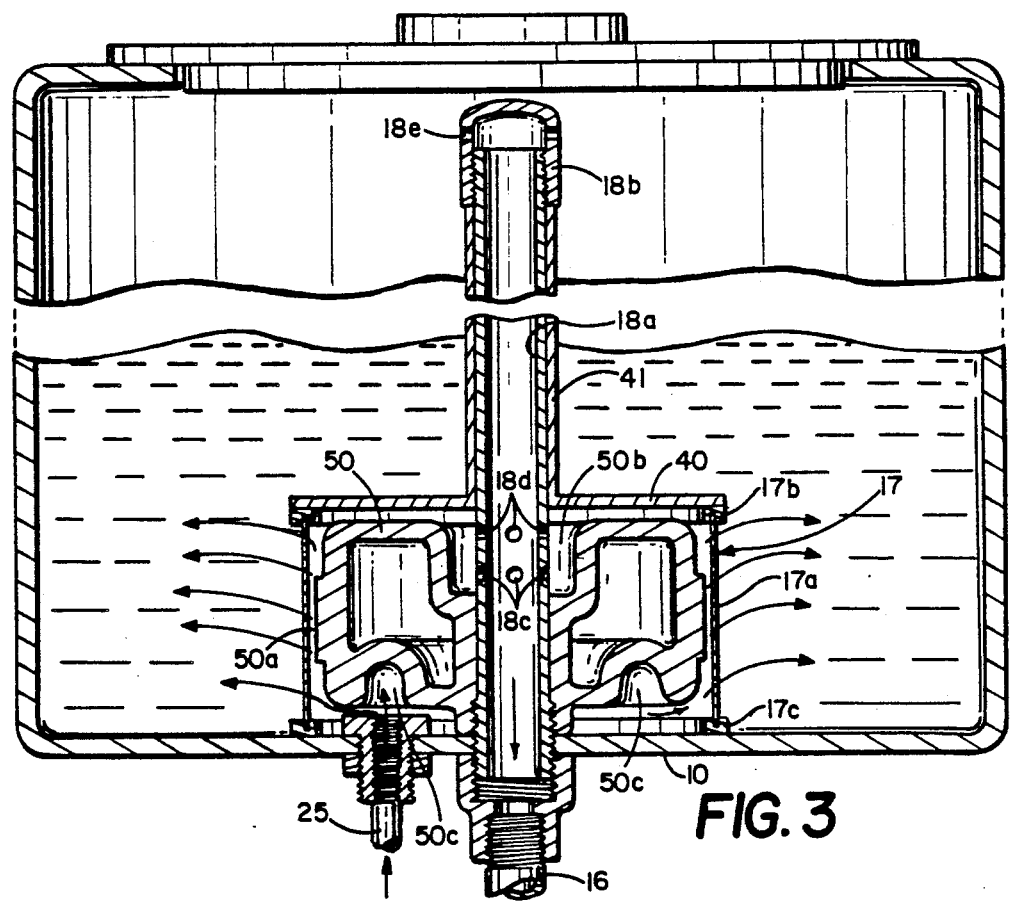
FIG. 3 is a similar view showing the direction and distribution of flow produced during the back flow filter cleaning flow pattern.

Liquid is supplied to the pump through the stand pipe 18a through ports 18b, as best shown in FIG. 2. This liquid flows inwardly through the cylindrical screen 17a and passes up around the plug member 50, and into an annular top passage 50b defined in the upper inside portion of the annular plug member 50.

When the pressure in liquid supply line 16 is above the pre-selected pressure set by the flow control bypass valve 30, liquid will flow upwardly through bypass conduit 25 and back into the filter chamber defined within the filter element 17. The flow of this bypass liquid will be directed outwardly b the plug member 50 into close association to the entire inside surface of the filter screen 17a. The bypass liquid will flow outwardly through substantially the entire area of the filter screen and will thus remove accumulations of solid material from the outside of the filter screen. Distribution of the backflow liquid through substantially the entire surface area of the screen will produce greatly improved cleaning of the entire area of the screen when compared with the cleaning action of the prior art Grave U.S. Pat. No 4,696,075.

The stand pipe 18a includes water flow passages 18c permitting flow of filtered liquid into the stand pipe 16 and conduit 18 from the filter chamber. Air bleed holes 18d and upper vent openings 18e permit removal of air from the liquid flowing through the pump. The clamping arrangement of the filter element 17 permits quick and easy changing of the filter without causing damage to the seals 17b and 17c.

What is claimed is:

1. A back flush filter system comprising,
   a liquid reservoir tank having an inside with a liquid level
   a main conduit having an inlet end communicating with the inside of the tank below the liquid level thereof, and having an outlet end,
   a pump connected to said conduit to pump liquid from said tank through the conduit,
   a backflow conduit having one end connected to an intermediate portion of said main conduit downstream of the pump and one end connected to lower portion of said tank to provide back flow of liquid to the tank from said pump and main conduit, a pressure regulating valve connected in the backflow conduit for controlling the flow through said back flow conduit to release liquid therethrough when the pressure in said main conduit exceeds a predetermined level.

a hollow filter element having a filter chamber defined therewithin, defining a filter surface area and mounted in the lower portion of said tank with both of said conduits communicating with the filter chamber defined within said hollow filter element, and a diffusing insert member mounted within said hollow filter element arranged to cause liquid flowing through the hollow filter element in both filtering and backflow directions to be diffused substantially uniformly across the filter surface area of the hollow filter element.

2. The structure set forth in claim 1 wherein said hollow filter element is a cylinder having closed ends to define the filter chamber therewithin, the tank ends of the conduits both located within said filter chamber, said diffusing insert member having a generally cylindrical outer configuration disposed in closely spaced relation to the inside of said cylindrical filter element to produce the diffused flow of liquid across the filter area.

3. The structure set forth in claim 1 and a distribution passage formed in said insert member communicating with the backflow conduit to cause uniform dispersion of the backflow liquid.

4. The structure set forth in claim 1 and a central stand pipe connected to the main conduit and extending through the filter chamber and having openings to receive filtered liquid from the filter chamber.

5. The structure set forth in claim 4 and air vent means in the stand pipe adjacent an upper portion of the filter chamber and said stand pipe extending upwardly above the liquid level in the reservoir tank with air vent openings in a top part of the stand pipe to remove air from the liquid flowing through said pump.

6. The structure set forth in claim 4 and a sleeve member surrounding the stand pipe with a filter clamping disc fixed to a lower portion of the sleeve to sealingly engage the top of the filter element and releasable means for clamping the sleeve member and clamping disc against the filter element to facilitate changing of the filter element without damaging the engaged end thereof.

* * * * *